(12) United States Patent
Luo (10) Patent No.: US 8,587,556 B2
(45) Date of Patent: Nov. 19, 2013

(54) TOUCH SCREEN 2D/3D DISPLAY SYSTEM AND METHOD

(75) Inventor: Jie Luo, Shenzhen (CN)

(73) Assignee: SuperD Co. Ltd., Shenzhen (CN)

( * ) Notice: Subject to any disclaimer, the term of this patent is extended or adjusted under 35 U.S.C. 154(b) by 179 days.

(21) Appl. No.: 13/049,921

(22) Filed: Mar. 17, 2011

(65) Prior Publication Data

US 2012/0169648 A1   Jul. 5, 2012

(30) Foreign Application Priority Data

Dec. 31, 2010   (CN) .......................... 2010 1 0619844

(51) Int. Cl.
*G06F 3/045* (2006.01)

(52) U.S. Cl.
USPC .............................. 345/174; 345/87; 345/211

(58) Field of Classification Search
USPC ............ 345/4–5, 173–178, 204–215; 349/12; 178/18.01–18.03, 18.06; 348/51–60
See application file for complete search history.

(56) References Cited

U.S. PATENT DOCUMENTS

| | | | | |
|---|---|---|---|---|
| 6,157,424 A | * | 12/2000 | Eichenlaub | 349/74 |
| 6,239,788 B1 | * | 5/2001 | Nohno et al. | 345/173 |
| 7,075,521 B2 | * | 7/2006 | Yamamoto et al. | 345/173 |
| 2002/0015007 A1 | * | 2/2002 | Perlin et al. | 345/6 |
| 2004/0184146 A1 | * | 9/2004 | Uehara et al. | 359/462 |
| 2008/0129680 A1 | * | 6/2008 | Kimura et al. | 345/102 |
| 2008/0284929 A1 | * | 11/2008 | Kimura | 349/38 |
| 2009/0002336 A1 | * | 1/2009 | Choi et al. | 345/174 |
| 2009/0207154 A1 | * | 8/2009 | Chino | 345/175 |
| 2010/0026636 A1 | * | 2/2010 | Jang et al. | 345/173 |
| 2010/0110029 A1 | * | 5/2010 | Yamamoto et al. | 345/173 |
| 2011/0102360 A1 | * | 5/2011 | Chen et al. | 345/173 |

FOREIGN PATENT DOCUMENTS

| | | |
|---|---|---|
| CN | 101634917 A | 1/2010 |
| WO | WO-2010009655 A1 * | 1/2010 |

* cited by examiner

*Primary Examiner* — Alexander Eisen
*Assistant Examiner* — Sanjiv D Patel
(74) *Attorney, Agent, or Firm* — Anova Law Group, PLLC (57) ABSTRACT

A display device is provided. The display device includes a liquid crystal display (LCD) panel for displaying images, a first electrode layer, and a second electrode layer coupled to the first electrode layer. The display device also includes a first driving circuit configured to provide a first driving signal and a second driving circuit configured to provide a second driving signal. Further, the display device includes a coupling unit coupled to the first driving circuit and the second driving circuit and configured to couple the first driving signal and the second driving signal, and to provide the coupled signal of the first driving signal and second driving signal to both of the first electrode layer and the second electrode layer such that the first driving signal drives the LCD panel for displaying the images, and the second driving signal drives the LCD panel for being touch-sensitive. The display device also includes a signal separation unit coupled to at least one of the first electrode layer and the second electrode layer to receive a feedback signal indicating a capacitance change corresponding to a touch on the LCD panel.

20 Claims, 6 Drawing Sheets

| |
|---|
| Polarizer 412 |
| Substrate 402 |
| First electrode layer 3022 |
| Alignment layer 406 |
| Liquid crystal layer 410 |
| Alignment layer 408 |
| Second electrode layer 3024 |
| Substrate 404 |
| Polarizer 414 |
| Backlight components 420 |

TOUCH SCREEN 2D/3D DISPLAY SYSTEM AND METHOD

CROSS-REFERENCES TO RELATED APPLICATIONS

This application claims the priority of Chinese patent application No. 2010106198446, filed on Dec. 31, 2010, the entire contents of which are incorporated herein by reference.

FIELD OF THE INVENTION

The present invention generally relates to display technologies and, more particularly, to the methods and systems for three-dimensional (3D) display with touch capabilities.

BACKGROUND

The existing touch panel device, also known as a touch screen, is an induction-type liquid crystal display (LCD) device able to receive input signals from contact points. The induction-type liquid crystal display device generally includes two layers: an upper layer and a lower layer. The lower layer is a traditional LCD display panel, and the upper layer is a transparent touch-sensitive screen. When a physical contact is made with the transparent screen, its touch feedback system can be pre-programmed to drive a variety of software programs or hardware. The transparent touch-sensitive screen often includes a capacitive screen type and a resistive screen type. Further, the capacitive screen type can use a so-called projected capacitive touch technology.

A projected capacitive touch screen can be further divided into two types: a self capacitance screen and a mutual capacitance screen. In a self capacitance screen, two electrode layers made with Indium tin oxide (ITO) are formed over the surface of the screen glass into horizontal and vertical electrode arrays. Each of the horizontal electrode array and the vertical electrode array has certain capacitance with respect to the ground. This capacitance is referred as self-capacitance, the capacitance between the electrode array and the ground. When a finger touches the screen, the finger's capacitance will be added to the self capacitance of the screen, so that the capacitance of the screen increases. The changes in the capacitance can be detected and the touch point position can be determined.

A mutual capacitance screen is also produced by forming two ITO electrode layers over the surface of the screen glass, as horizontal and vertical electrode arrays. The mutual capacitance screen differs from the self capacitive screen in that the capacitance of the mutual capacitance screen is the capacitance between the horizontal electrode array and the vertical electrode array. That is, the horizontal electrode array and the vertical electrode array are two layers of a capacitor of the mutual capacitance screen. When a finger touches the capacitive screen, the touch impacts the coupling between the two electrode layers, and thus changes the capacitance between the two electrode layers. The changes in capacitance can be detected and the touch point position can be determined.

A resistance touch screen often has a hard coating surface to protect an underlying polyester film (PET) layer. Between the hard coating surface and a glass substrate, there are two layers of transparent conductive ITO respectively corresponding to the X-axis and the Y-axis. The two layers of ITO are insulated by transparent fine particles. When a finger touches the screen, the pressure from the touch causes a connection of the two conductive layers at the touch point. Different touch points correspond to different output resistances from the touch points. An output voltage corresponding to a position of the touch point can thus be obtained (in an analog format), and the voltage is further A/D converted to derive the X and Y coordinates of the touch point.

Thus, conventional touch screen technologies generally require a touch-sensitive transparent screen on top of a display screen. The touch-sensitive transparent screen is often attached to the display screen using optical glue. However, the production process of this type of layered touch screen is often troublesome due to strict manufacturing process requirements, and thus may substantially increase the production cost of the layered touch screens. Further, by adding the extra transparent touch-sensitive layer, the thickness and weight of the touch screen can also be increased.

The disclosed methods and systems are directed to solve one or more problems set forth above and other problems.

BRIEF SUMMARY OF THE DISCLOSURE

One aspect of the present disclosure includes a display device. The display device includes a liquid crystal display (LCD) panel for displaying images, a first electrode layer, and a second electrode layer coupled to the first electrode layer. The display device also includes a first driving circuit configured to provide a first driving signal and a second driving circuit configured to provide a second driving signal. Further, the display device includes a coupling unit coupled to the first driving circuit and the second driving circuit and configured to combine the first driving signal and the second driving signal, and to provide the combined first driving signal and second driving signal to both of the first electrode layer and the second electrode layer such that the first driving signal drives the LCD panel for displaying the images, and the second driving signal drives the LCD panel for being touch-sensitive. The display device also includes a signal separation unit coupled to at least one of the first electrode layer and the second electrode layer to receive a feedback signal indicating a capacitance change corresponding to a touch on the LCD panel.

Another aspect of the present disclosure includes a method for a display device. The display device includes an LCD panel for displaying images, a first electrode layer, and a second electrode layer coupled to the first electrode layer. The method includes generating a first driving signal and a second driving signal, and combining the first driving signal and the second driving signal. The method also includes providing the combined signal of the first driving signal and second driving signal to both of the first electrode layer and the second electrode layer such that the first driving signal drives the LCD panel for displaying the images, and the second driving signal drives the LCD panel for being touch-sensitive. Further, the method includes receiving from at least one of the first electrode layer and the second electrode layer a feedback signal indicating a capacitance change corresponding to a touch on the LCD panel, and determining a touch position of the touch on the LCD panel based on the feedback signal.

Another aspect of the present disclosure includes a display device. The display device includes an LCD panel for displaying images and an optical device. The optical device includes a first electrode layer, a second electrode layer, a liquid crystal layer coupled between the first electrode layer and the second electrode layer, and a lens unit. Further, the display device includes a first driving circuit configured to provide a first driving signal, and a second driving circuit configured to provide a second driving signal. The display device also includes a coupling unit coupled to the first driving circuit and the second driving circuit and configured to combine the first driving signal and the second driving signal and to provide the combined signal of the first driving signal and second driving signal to both of the first electrode layer and the second electrode layer such that the first driving signal drives the optical device for processing lights from the LCD panel, and the second driving signal drives the optical device for being touch-sensitive. In addition, the display device includes a signal separation unit coupled to at least one of the first electrode layer and the second electrode layer to receive a feedback signal indicating a capacitance change corresponding to a touch on the optical device.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
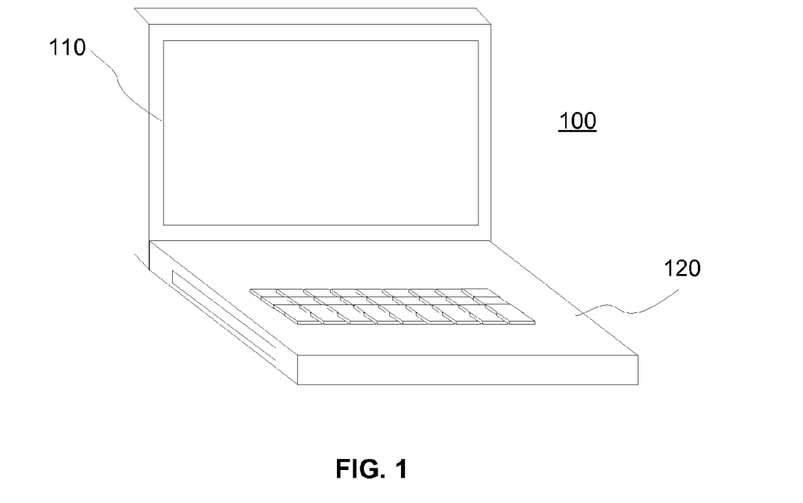
FIG. 1 illustrates an exemplary environment incorporating certain aspects of the invention.

FIG. 1 illustrates an exemplary environment incorporating certain aspects of the invention. As shown in FIG. 1, a three-dimensional (3D) display system 100 may include a 3D display device 110 and a base 120. 3D display system 100 may include any appropriate device that capable of processing and displaying two-dimensional (2D) or 3D images, such as a computer, a television set, a smart phone, or a consumer electronic device. Although 3D display system 100 is shown as a notebook computer, any device with computing power may be included.

3D display device 110 may include any appropriate type of display screen based on plasma display panel (PDP) display, field emission display (FED), cathode ray tube (CRT) display, liquid crystal display (LCD), organic light emitting diode (OLED) display, or other types of displays. Further, 3D display device 110 may also be touch-sensitive, i.e., a touch screen. Other display types may also be used.

Figure 2:
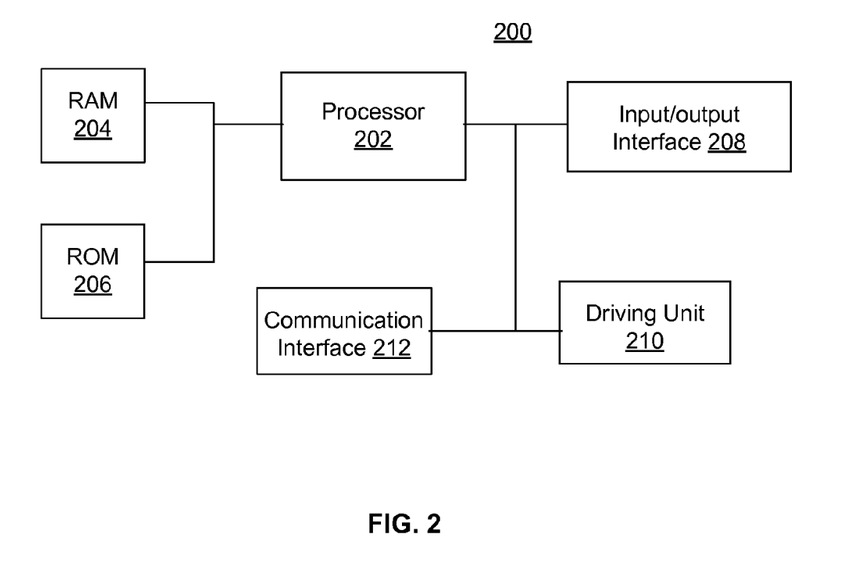
FIG. 2 illustrates an exemplary controller consistent with the disclosed embodiments.

Base 120 may include any appropriate structures and components to support operations of 3D display system 100. For example, base 120 may include a controller to control operation of 3D display device 110. FIG. 2 illustrates an exemplary controller consistent with the disclosed embodiments. As shown in FIG. 2, controller 200 may include a processor 202, a random access memory (RAM) unit 204, a read-only memory (ROM) unit 206, an input/output interface unit 208, a driving unit 210, and a communication interface 212. Other components may be added and certain devices may be removed without departing from the principles of the disclosed embodiments.

Processor 202 may include any appropriate type of graphic processing unit (GPU), general-purpose microprocessor, digital signal processor (DSP) or microcontroller, and application specific integrated circuit (ASIC), etc. Processor 202 may execute sequences of computer program instructions to perform various processes associated with display system 100. The computer program instructions may be loaded into RAM 204 for execution by processor 202 from read-only memory 206.

Input/output interface 208 may be provided for users to input information into display system 100 or for the users to receive information from display system 100. For example, input/output interface 208 may include any appropriate input device, such as a remote control, a keyboard, a mouse, an electronic tablet, a voice communication device, or any other optical or wireless input device. Further, driving unit 210 may include any appropriate driving circuitry to drive various devices, such as display device 110. Further, communication interface 212 may provide communication connections such that controller 200 may be accessed by and/or communicate with other processors or systems through computer networks or other communication links via various communication protocols, such as transmission control protocol/internet protocol (TCP/IP) and hyper text transfer protocol (HTTP).

Figure 3:
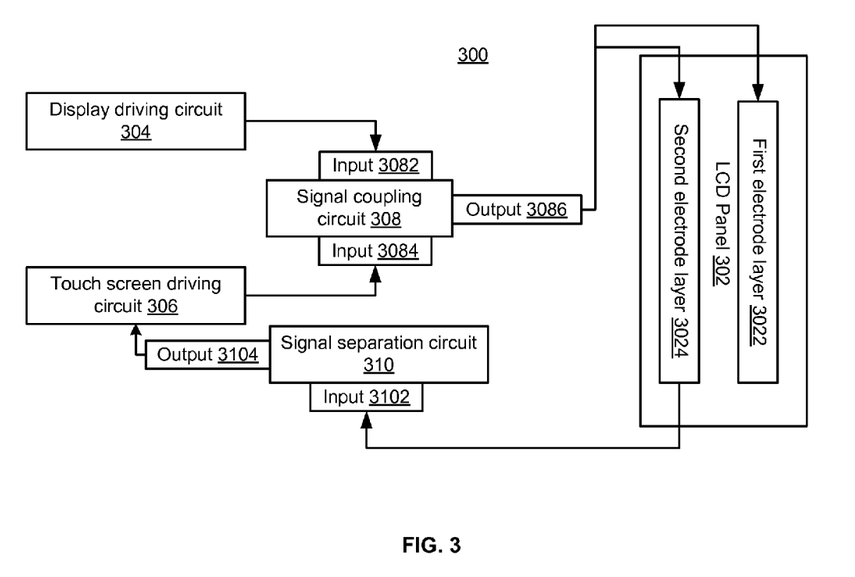
FIG. 3 illustrates an exemplary display device consistent with the disclosed embodiments.

FIG. 3 illustrates an exemplary display device consistent with the disclosed embodiments. As shown in FIG. 3, display device 300 may include an LCD panel 302, a display driving circuit 304, a touch screen driving circuit 306, a signal coupling circuit 308, and a signal separation circuit 310. Other components may also be included.

Further, LCD panel 302 may include a first electrode layer 3022 and a second electrode layer 3024. Signal coupling circuit 308 may include an input 3082, an input 3084, and an output 3086. Signal separation circuit 310 may include an input 3102 and an output 3104. Any number of inputs and/or outputs may be provided to signal coupling circuit 308 and signal separation circuit 310.

Display driving circuit 304 may provide a first driving signal at a first frequency, with a first bandwidth, and/or at a first signal strength. The first driving signal is used to generate electric fields between first electrode layer 3022 and second electrode layer 3024 for display. At the same time, touch screen driving circuit 306 may provide a second driving signal at a second frequency, with a second bandwidth, and/or at a second signal strength. The second driving signal is used for touch-screen applications.

Signal coupling circuit 308 receives both the first driving signal and the second driving signal from display driving circuit 304 and touch screen driving circuit 306 on input 3082 and input 3084, respectively. Further, signal coupling circuit 308 may couple or combine the first driving signal and the second driving signal together, and send the combined signals to both first electrode layer 3022 and second electrode layer 3024 from output 3086. For example, signal coupling circuit 308 may use a frequency division multiplexing method to combine first driving signal and the second driving signal. The first driving signal may have a different frequency bandwidth from the second driving signal. For example, the first driving signal may have a narrower bandwidth than the second driving signal. Any appropriate multiplexing methods and frequency bandwidth may be used.

When the combined signals are applied on first electrode layer 3022 and second electrode layer 3024, because the first driving signal and the second driving signal differ in frequency, bandwidth, and/or signal strength, the signals may be configured in certain ways such that only the first driving signal generates electric fields between first electrode layer 3022 and second electrode layer 3024 for display, while the second driving signal has no or insignificant influence on the electric fields between first electrode layer 3022 and second electrode layer 3024 for display. For example, the first driving signal may be in a frequency range of 10 to 1 KHz; while the second driving signal may be in a frequency range of greater than 1 KHz. In certain embodiments, the first driving signal may be of the frequency of approximately 120 Hz; while the second driving signal may be of a frequency of approximately 240 kHz. Other frequencies may also be used, and the frequencies of the first driving signal and the second driving signal may be interchangeable.

The second driving signal may be provided to first electrode layer 3022 and second electrode layer 3024 such that a capacitance between first electrode layer 3022 and second electrode layer 3024 can be generated. When a user finger touches LCD panel 302, the capacitance between first electrode layer 3022 and second electrode layer 3024 may be changed, and a signal from either first electrode layer 3022 or second electrode layer 3024 may be feedback to indicate such capacitance changes. Alternatively, signals from both first electrode layer 3022 and second electrode layer 3024 may be feedback to indicate such capacitance changes.

For example, a third signal from second electrode layer 3024 may be provided to signal separation circuit 310 on input 3102. The third signal may be processed by signal separation circuit 310 and a capacitance change signal may be separated from the third signal. Further, the capacitance change signal is provided back to touch screen driving circuit 306 on output 3104. Based on the capacitance change signal, touch screen driving circuit 306 or controller 200 may determine coordinates of a corresponding touch point. Optionally, a sampling circuit (not shown) may be coupled between signal separation circuit 310 and touch screen driving circuit 306 for sampling the signal before being received by touch screen driving circuit 306. Based on the touch point position, or a track of a series of touch points, together with contents displayed on LCD panel 302, controller 200 may determine related operations in software, hardware, or both.

Thus, display device 300 achieves touch screen functionalities without using the combination of a display panel and a separate touch-sensitive transparent screen. Instead, display device 300 uses two electrode layers in the LCD display panel used to drive the liquid crystal layer as electrode layers for a capacitive touch screen. The driving signal for driving display and the driving signal for driving touch screen may be combined using, for example, a frequency division multiplexing method such that the driving signals are sent to the two electrode layers in different frequency bands and/or with different signal strength such that the LCD display panel can be a display screen and a touch screen at the same time.

Figure 4:
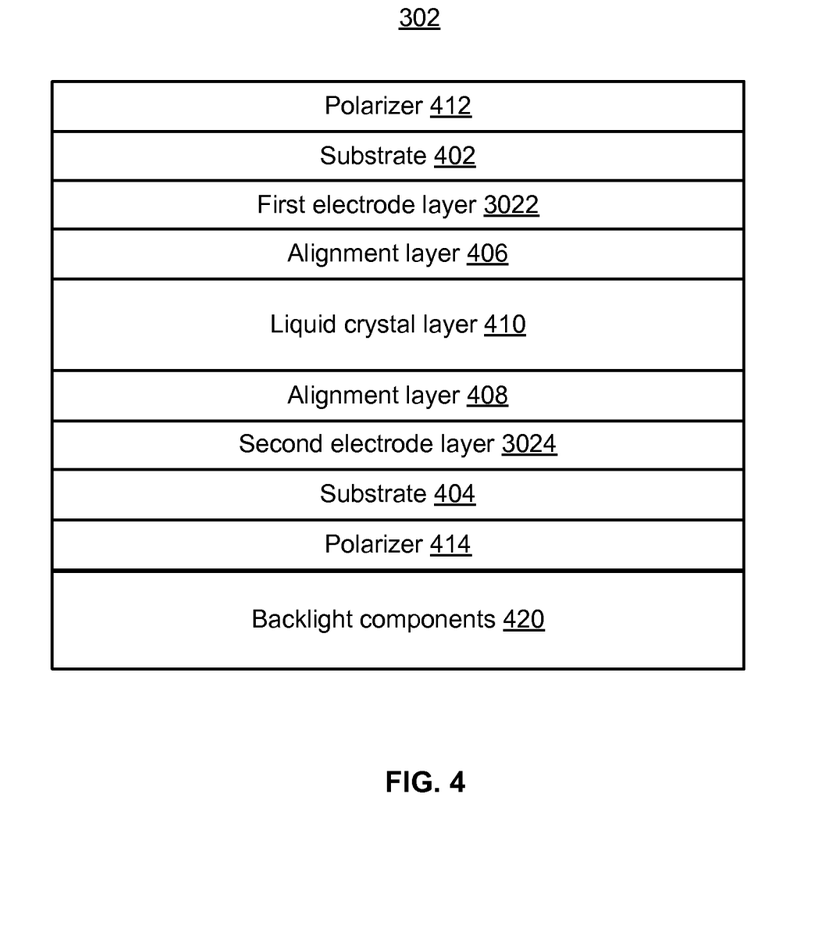
FIG. 4 illustrates an exemplary LCD panel consistent with the disclosed embodiments.

FIG. 4 illustrates an exemplary LCD panel consistent with the disclosed embodiment. As shown in FIG. 4, LCD panel 302 includes two substrates 402 and 404, first electrode layer (e.g., ITO) 3022, second electrode layer (e.g., ITO) 3024, alignment layers 406 and 408, liquid crystal layer 410, polarizers 412 and 414, and backlight components 420. Other components may be included and certain components may be omitted. Other LCD panel structures or formats may also be used.

More particularly, substrates 402 and 404 may be any appropriate type of transparent optical materials, such as glasses. First electrode layer 3022 and alignment layer 406 may be formed on substrate 402, and second electrode layer 3024 and alignment layer 408 may be formed on substrate 404. Further, liquid crystal layer 410 is contained between substrates 402 and 404 and coupled between alignment layers 406 and 408, as well as between first electrode layer 3022 and second electrode layer 3024. Backlight components 420 may provide backlight to LCD panel 302.

Polarizers 412 and 414 may be of a same polarization direction, and light from backlight components enters polarizer 414 first. The polarized light then enters the liquid crystal layer 410. When no electric field exists between first electrode layer 3022 and second electrode layer 3024, the liquid crystal molecules in liquid crystal layer 410 are twisted by alignment layers 406 and 408 as to be perpendicular to the polarization direction. Thus, the twisted polarized light cannot pass through polarizer 412, and the state of LCD panel 302 is closed (OFF).

When display driving signal is applied to first electrode layer 3022 and second electrode layer 3024 to generate an electric field between first electrode layer 3022 and second electrode layer 3024, the liquid crystal molecules in liquid crystal layer 410 are untwisted by the electric field. Thus, the untwisted polarized light can pass through polarizer 412, and the state of LCD panel 302 is open (ON).

Thus, first electrode layer 3022 and second electrode layer 3024 are electrode layers for driving the LCD panel 302 for display. However, as explained in FIG. 3, first electrode layer 3022 and second electrode layer 3024 may also be used as electrode layers of a touch screen capacitor. For example, first electrode layer 3022 and second electrode layer 3024 may be of various shapes, such as a plate, a series of strips, a series of lines, or other geometric shapes or combinations. Further, first electrode layer 3022 and second electrode layer 3024 may be used to form a self-capacitance touch screen. Alternatively, first electrode layer 3022 and second electrode layer 3024 may be used to form a mutual-capacitance touch screen. Or LCD panel 302 may be configured as a self-capacitance touch screen or a mutual-capacitance touch screen during run-time.

Further, as explained in FIG. 3, the first driving signal is provided to drive the display and the second driving signal is provided to drive the touch screen. In certain embodiments, the frequency of the first driving signal is lower than that of the second driving signal. For example, the first driving signal may be a low-frequency signal, while the second driving signal may be a high-frequency signal. Or the first driving signal may be a high-frequency signal, while the second driving signal may be a low-frequency signal. The relationship between the first driving signal and the second driving signal may be maintained in certain ways such that the difference between the first driving signal and the second driving signal is sufficient not to cause interferences between the first driving signal and the second driving signal when driving the first electrode layer 3022 and the second electrode layer 3024 at the same time.

In addition, when configured as a self capacitance touch screen, the first electrode layer 3022 and the second electrode layer 3024 may be configured to respectively contain a horizontal electrode array and a vertical electrode array. The horizontal electrode array may form a capacitor with respect to ground, and the vertical electrode array may also form a capacitor with respect to the ground. These electrode-ground capacitors are called self-capacitors, and the capacitance of a self capacitor is called self capacitance. When a user finger touches the LCD panel, the finger's capacitance is added to the self capacitance of the electrodes, and the total capacitance of LCD panel 302 is increased.

During touch detection, the self capacitance of the horizontal electrode array and the vertical electrode array may be detected separately. According to the changes in the self capacitance before and after the touch, the horizontal and vertical coordinates can be determined. The coordinates are then combined into a set of touch coordinates. Thus, a scan mode for the self capacitance screen is to project the touch point of the touch screen onto the X-axis and Y-axis, respectively, then to calculate the coordinates in the X-axis and Y-axis directions, and finally to combine the X-axis and Y-axis coordinates into a set of touch-point coordinates.

For a single touch, the projections on the X-axis and Y-axis are unique, and the combination of the coordinates is unique. However, if there are two touch points, two projections exist in each of the X-axis direction and Y-axis direction, and thus there can be four sets of combined coordinates.

Further, when configured as a mutual capacitance touch screen, the first electrode layer 3022 and the second electrode layer 3024 may be configured to respectively contain a horizontal electrode array and a vertical electrode array. Each intersection between the horizontal electrode array and the vertical electrode array may form a capacitor between the corresponding horizontal electrode and the vertical electrode, i.e., two electrodes of the mutual capacitor. When the user finger touches the LCD panel, the finger's touch impacts the coupling between the horizontal electrode and the vertical electrode around the touch point, and thus changes the capacitance of the mutual capacitor.

During mutual capacitance detection, the second driving signal is sent to the horizontal electrodes and electrical signals from the vertical electrodes or the horizontal electrodes are received to determine the capacitance of each intersection of the horizontal electrodes and the vertical electrodes, i.e., the capacitance of the two-dimensional plane of the mutual capacitance screen. Based on changes in the two-dimensional capacitance of the mutual capacitance screen, a set of coordinates can be calculated for every touch point. Therefore, even if there are multiple touch points on the screen, actual coordinates can be calculated for each touch point.

Figure 5:
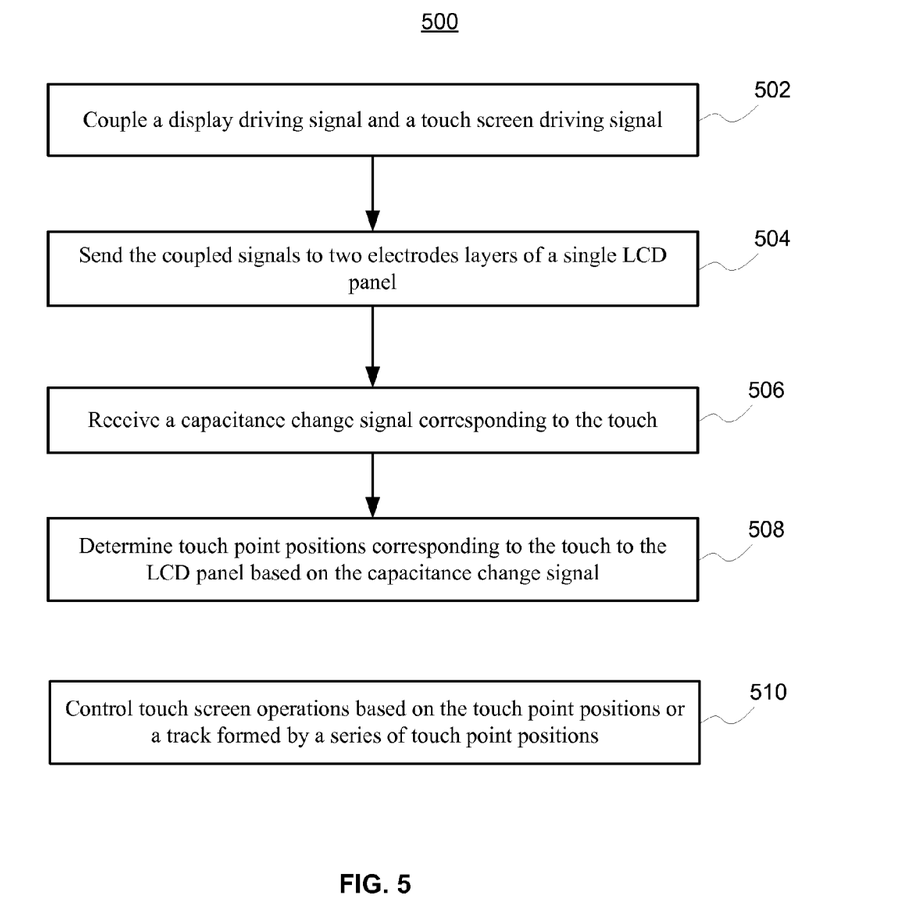
FIG. 5 illustrates an exemplary touch operation process consistent with the disclosed embodiments.

FIG. 5 illustrates an exemplary touch operation process 500 consistent with the disclosed embodiments. Touch operation process 500 may be performed by LCD panel 302 (e.g., controller 200 and/or touch screen driving circuit 306). As shown in FIG. 5, controller 200 may cause signal coupling circuit 308 to couple together a display driving signal and a touch screen driving signal (502). The display driving signal drives the electric field(s) between two electrode layers (e.g., first electrode layer 3022 and second electrode layer 3024) of LCD panel 302 for displaying images, while the touch screen driving signal drives the two electrode layers to form capacitance touch screen. Further, controller 200 may cause signal coupling circuit 308 to send the coupled display driving signal and touch screen driving signal to the two electrode layers of LCD panel 302 (504).

When a user touches the LCD panel 302, touch screen driving circuit 306 or controller 200 may receive a capacitance change signal corresponding to the touch (506). Further, touch screen driving circuit 306 or controller 200 may determine one or more touch point positions on the LCD panel 302 based on the capacitance change signal (508). Controller 200 may also control touch screen operations based on the touch point positions or a track of a series of touch positions (510). For example, controller 200 may use current displayed contents as references and combined the contents with the touch position or positions, or a track of touch positions, to determine corresponding touch screen operations, such as displaying a different image or any other input/output operations.

Figure 6:
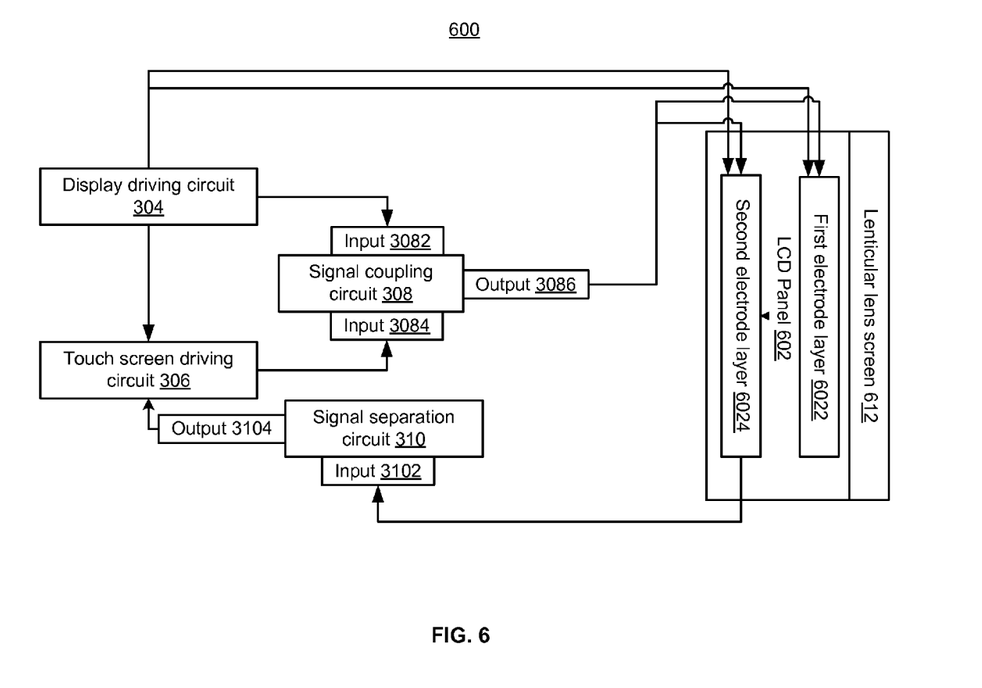
FIG. 6 illustrates an exemplary 3D display device consistent with the disclosed embodiments.

FIG. 6 illustrates an exemplary 3D display device 600 consistent with the disclosed embodiments. As shown in FIG. 6, a lenticular lens screen 612 is coupled to LCD panel 602 for 3D display. Similar to display device 300 in FIG. 3, display driving circuit 304 may generate a first driving signal to be coupled with a second driving signal from touch screen driving circuit 306 by signal coupling circuit 308. The coupled first driving signal and second driving signal may be provided to both first electrode layer 6022 and second electrode layer 6024. Further, the first driving signal is also directly provided to both first electrode layer 6022 and second electrode layer 6024. The first driving signal is generated for display and based on an image source (not show).

For 3D display, the image source may provide 3D images or other 3D graphic information. A 3D image may include a plurality of images of different views, with certain parallax between neighboring view images, sliced together. For example, a stereo format 3D image may include two images, a first or left image and a second or right image combined together. The display driving signal (e.g., the first driving signal) may be generated and applied to the electrodes of first electrode layer 6022 and second electrode layer 6024 to display the 3D image (e.g., a first image and a second image) on LCD panel 602.

Further, the parallax between the first image and the second image is configured in certain way such that light from pixels displaying a first image is guided by lenticular lens screen 612 to a viewer's left eye (the left image) and light from pixels displaying a second image is guided by lenticular lens screen 612 to a viewer's right eye (the right image). Thus, the user can perceive the 3D image, and lenticular lens screen 612 is provided to separate different view images to be viewed by the user's two eyes separately and independently. Of course, when display device 600 is an autostereoscopic display device, the 3D image includes multiple images from a multitude of views corresponding to different viewing angles. Other types of 3D display panel may also be supported.

The display driving circuit 304 may provide the display driving signal to display a 3D window and a touch button, and may also obtain coordinates of the 3D window as an address driving circuit. Further, display driving circuit 304 may provide the coordinates of the 3D window to touch screen driving circuit 306.

As the address driving circuit, the display driving circuit 304 converts the coordinates of the 3D window into a 120 Hz driving signal; while the touch screen driving circuit 306 generates a 240 KHz continuous oscillating signal. The driving signal from display driving circuit 304 and the oscillating signal from touch screen driving circuit 306 is coupled into a wide bandwidth signal to be provided to first electrode layer 6022 and second electrode layer 6024.

When a user's finger touches LCD panel 602 or the lenticular lens screen 612, the capacitance between first electrode layer 6022 and second electrode layer 6024 may be changed, and a signal from either first electrode layer 6022 or second electrode layer 6024 may be feedback to indicate such capacitance changes. Alternatively, signals from both first electrode layer 6022 and second electrode layer 6024 may be feedback to indicate such capacitance changes.

For example, a third signal from second electrode layer 6024 may be provided to signal separation circuit 310 on input 3102. The third signal may be processed by signal separation circuit 310 and a capacitance change signal may be separated from the third signal. Further, the capacitance change signal is provided back to touch screen driving circuit 306 on output 3104. Based on the capacitance change signal, touch screen driving circuit 306 or controller 200 may determine coordinates of a corresponding touch point. Optionally, a sampling circuit (not shown) may be coupled between signal separation circuit 310 and touch screen driving circuit 306 for sampling the signal before being received by touch screen driving circuit 306. Based on the touch point position, or a track of a series of touch points, together with contents displayed on LCD panel 602, controller 200 may determine related operations in software, hardware, or both. That is, controller 200 may determine whether and where the user's finger touches, for example, the touch button in the 3D window, and may control a response to the touch of the touch button with software and/or hardware operations.

Thus, 3D display device 600 achieves touch screen functionalities without using the combination of a 3D display panel and a separate touch-sensitive transparent screen. Instead, 3D display device 600 uses two electrode layers in the LCD display panel used to drive the liquid crystal layer as electrode layers for a capacitive touch screen. In addition, as the address driving circuit, the display driving circuit 304 may also convert the coordinates of the 3D window into a driving signal of a different frequency; while the touch screen driving circuit 306 generates a continuous oscillating signal of another different frequency. For example, display driving circuit 304 may generate the driving signal within a frequency range of 10 to 1 KHz; while touch screen driving circuit 306 generates the oscillating signal at a frequency greater than 1 KHz.

Figure 7:
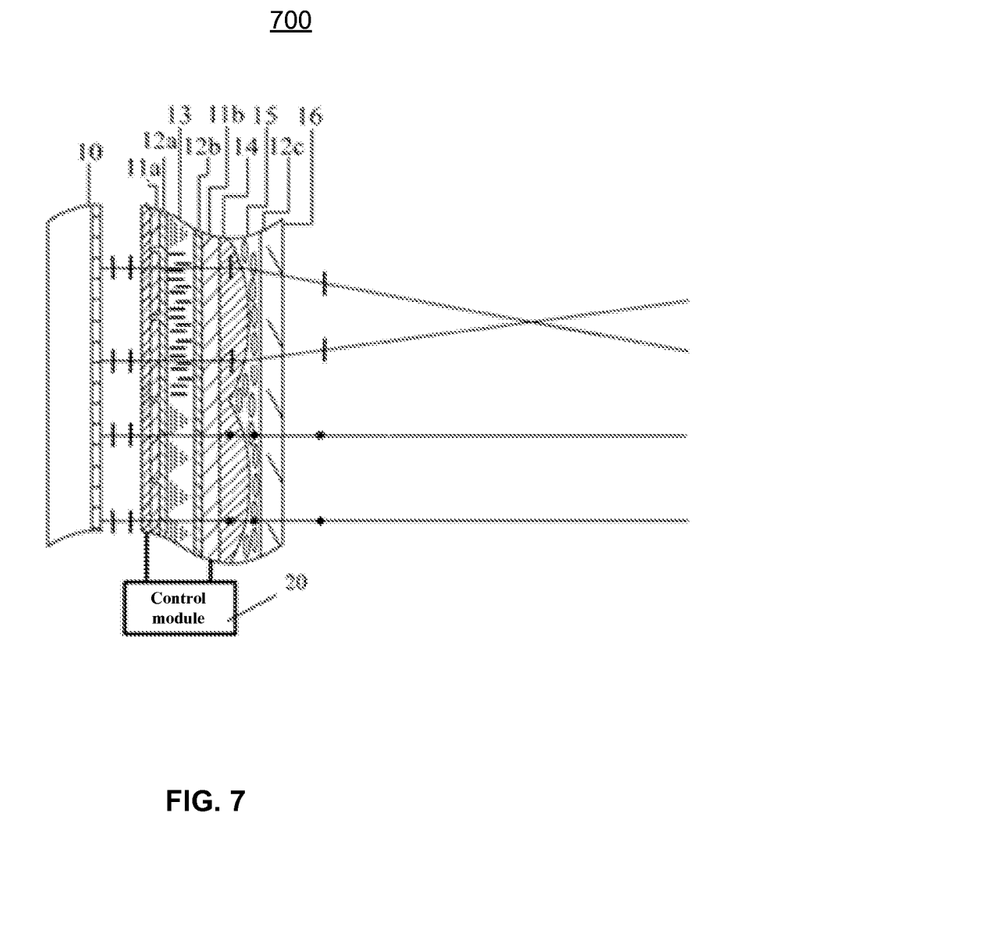
FIG. 7 illustrates an exemplary 3D display device consistent with the disclosed embodiments.

FIG. 7 illustrates an exemplary 3D display device consistent with the disclosed embodiments. Because the driving circuits and other components are similar to FIGS. 3 and 6, only 3D display panel 700 is shown for illustrative purposes. As shown in FIG. 7, 3D display panel 700 includes a LCD panel 10 for display images. Further, 3D display panel 700 includes an optical device coupled to LCD panel 10 for 2D/3D image processing. The optical device includes electrode layer 11a (e.g, ITO on glass), electrode layer 11b (e.g., ITO on glass), alignment layer 12a, alignment layer 12b, nematic liquid crystal 13, and a lens unit. The lens unit includes a first lens array 14, a second lens array 15, and a glass substrate 16. Further, an alignment layer 12c is also formed on glass substrate 16. The optical device coupled to the LCD panel 10 such that 2D and 3D images can be viewed by a user properly.

A driving circuit (e.g., display driving circuit 304) may be provided for the LCD panel 10 to display 3D images, and another driving circuit (e.g., display driving circuit 304) may be provided to the optical device and, more specifically, electrode layer 11a and electrode layer 11b of optical device to implement 3D light processing. Electrode layer 11a may include a series of electrodes in the shape of rectangle, square, circle, or other irregular shapes. Electrode layer 11b may also include a series of electrodes or may include a common electrode in the shape of a plate or other shapes.

Thus, signal coupling circuit 308 may provide the coupled driving signals (e.g., the optical device driving signal and the touch screen driving signal) to electrode layer 11a and electrode layer 11b. A third signal from one of electrode layer 11a and electrode layer 11b or both of electrode layer 11a and electrode layer 11b may be provided back to signal separation circuit 310 to indicate capacitance changes corresponding to any touch on glass substrate 16. The electrode layer 11a and electrode layer 11b may be used to form a self-capacitance touch screen or a mutual-capacitance touch screen, and the capacitance detection is explained in previous sections and omitted herein.

Further, a control module 20 is provided to control the optical device (e.g., voltages between electrode layer 11a and electrode layer 11b) for 3D light processing. Control module 20 may coincide with controller 200 and/or display driving circuit 304.

When there is no electric field between electrode array 11a and common electrode 11b, lights outputting from alignment layer 12b are in the same direction as the polarized lights from LCD panel 10 entering the optical device. When there are electric fields between electrode array 11a and common electrode 11b, lights outputting from alignment layer 12b are in the direction perpendicular to the polarized lights from LCD panel 10 entering the optical device. A polarizer may be placed between LCD panel 10 and the optical device such that polarized lights are from LCD panel 10.

The lens unit includes first lens array 14 and second lens array 15. First lens array 14 may have a plane light incident surface on one side and a plurality of convex surfaces on the other side. First lens array 14 may be made of optically isotropic materials with a single refractive index of $n_1$.

The second lens array 15 may have a plurality of concave light incident surfaces on one side and a plane light output surface on the other side. Each concave lens may be coupled to corresponding convex lens from first lens array 14, which may make the two lens arrays a tight-fit, coupled, and double flat surface unit. Other configurations may also be used. Further, second lens array 15 may be made of optically anisotropic materials.

Optically anisotropic material may be birefringent or double refraction, meaning the optically anisotropic material has two different refractive indices, an ordinary refractive index $n_o$ and an extraordinary refractive index $n_e$. Lights with a polarization direction perpendicular to the lens' optical axis have the refractive index of $n_o$; while lights with a polarization direction parallel to the lens' optical axis have a refractive index of $n_e$. Further, $n_1 = n_o$, and $n_o > n_e$. That is, when first lens array 14 is a convex lens array, the refractive index of the first lens array is equal to a larger one of an ordinary refractive index and an extraordinary refractive index of second lens array 15.

For illustrative purpose, polarized lights outputted from LCD panel 10 are referred as first polarized lights with a particular polarization direction. If the polarization direction is changed by liquid crystal layer 13, the polarized lights outputted from liquid crystal layer 13 are referred as second polarized lights with a different polarization direction. Otherwise, liquid crystal layer 13 merely passes the first polarized lights. That is, if liquid crystal layer 13 does not change the polarization direction of the first polarized lights, no second polarized lights may exist. Further, first alignment layer 12a may have the same alignment direction as the first polarized lights, which may be realized by a polarizer over LCD panel 10.

During operation, LCD panel 10 may have both 3D and 2D display on different portions of the screen. For example, as shown in FIG. 7, the upper two rays represent lights for 3D display, and the lower two rays represent lights for 2D display. For 3D display, control module 20 may control liquid crystal layer 13 such that pixel display areas corresponding to the lights for 3D display pass through the first polarized lights of pixels outputted from LCD panel 10 without change in polarization direction.

The first polarized lights then pass first lens array 14 and enter second lens array 15. Because the optical axis of second lens array 15 is parallel to the polarization direction of the first polarized lights, second lens array 15 has a refractive index of $n_e$, $n_1 > n_e$. Thus, this difference between the refractive indices, an optical step, makes lights at the interface between the convex surface of first lens array 14 and the concave surface of second lens array 15 converging. The coupled lens array thus acts as a convex lens and directs the first polarized lights (e.g., lights from a right image and a left image) to a viewer's right eye and left eye respectively to realize 3D display.

On the other hand, for 2D display, control module 20 may control liquid crystal layer 13 such that pixel display areas corresponding to the lights for 2D display change the polarization direction of the first polarized lights by 90 degrees. Then, the second polarized lights are outputted from liquid crystal layer 13. Because the polarization direction of the second polarized lights is now perpendicular to the optical axis of second lens array 15, second lens array 15 has a refractive index of $n_0$, and $n_1 = n_o$. Thus, no optical step exists at the interface between convex surface of first lens array 14 and the concave surface of second lens array 15. The second polarized lights therefore go straight through the coupled lens array to the viewer's both eyes without separation to realize 2D display.

By using the disclosed systems and methods, touch screens without extra transparent touch-sensitive screens may be provided to both 2D and 3D LCD and other types display devices. Manufacturing cost of the touch screens may be significantly reduces, and the thickness and quality of touch screens may also be significantly optimized. Other advantageous applications are also obvious to those skilled in the art.

What is claimed is:

1. A display device, comprising:
    a liquid crystal display (LCD) panel for displaying images, which comprises a first polarizer, a first glass substrate coupled to the first polarizer, a first electrode layer formed on the first glass substrate, a first alignment layer formed on the first electrode layer, a second polarizer, a second glass substrate coupled to the second polarizer, a second electrode layer formed on the second glass substrate, a second alignment layer formed on the second electrode layer, and a liquid crystal layer formed between the first alignment layer and the second alignment layer, wherein the second electrode layer is coupled to the first electrode layer;
    a first driving circuit configured to provide a first driving signal at a first frequency;
    a second driving circuit configured to provide a second driving signal at a second frequency, different from the first frequency;
    a coupling unit coupled to the first driving circuit and the second driving circuit to receive the first driving signal and the second driving signal at the same time and configured to couple the first driving signal and the second driving signal in a frequency domain, and to provide the coupled signal of the first driving signal and second driving signal to both of the first electrode layer and the second electrode layer such that the first driving signal drives the LCD panel for displaying the images, and the second driving signal drives the LCD panel for being touch-sensitive; and
    a signal separation unit, separate and different from the first driving circuit and the second driving circuit, coupled to at least one of the first electrode layer and the second electrode layer to receive a feedback signal and to separate from the feedback signal a capacitance change signal indicating a capacitance change corresponding to a touch on the LCD panel,
    the first driving circuit is further configured to separately provide a third driving signal to both of the first electrode layer and the second electrode layer of the LCD panel without going through the coupling unit, in addition to and together with the coupled first and second driving signals, wherein the third driving signal and the first driving signal effect 3D image display.

2. The display device according to claim 1, wherein:
    the signal separation unit is further coupled to the second driving circuit to provide the capacitance change signal to the second driving circuit for calculating a touch position of the touch on the LCD panel.

3. The display device according to claim 1, wherein: the first frequency has a bandwidth lower than a bandwidth of the second frequency.

4. The display device according to claim 1, wherein:
    the first frequency is in a range of approximately 10 to 1 KHz; and the second frequency is greater than 1 KHz.

5. The display device according to claim 1, wherein:
    the first frequency is approximately 120 Hz; and
    the second frequency is approximately 240 Hz.

6. The display device according to claim 1, wherein:
    the first electrode layer and the second electrode layer are configured to form a self-capacitance structure when the second driving signal is provided to the first electrode layer and the second electrode layer.

7. The display device according to claim 1, wherein:
    the first electrode layer and the second electrode layer are configured to form a mutual-capacitance structure when the second driving signal is provided to the first electrode layer and the second electrode layer.

8. The display device according to claim 1, further including:
    a lenticular lens screen coupled to the LCD panel for displaying 3D images.

9. A method for a display device including a liquid crystal display (LCD) panel for displaying images, which comprises a first electrode layer and a second electrode layer coupled to the first electrode layer, the method comprising:
    generating a first driving signal at a first frequency and a second driving signal at a second frequency different from the first frequency;
    receiving the first driving signal and the second driving signal at the same time;
    coupling the first driving signal and the second driving signal in a frequency domain by a coupling unit;
    providing the coupled signal of the first driving signal and second driving signal to both of the first electrode layer and the second electrode layer such that the first driving signal drives the LCD panel for displaying the images, and the second driving signal drives the LCD panel for being touch-sensitive;
    separately providing a third driving signal to both of the first electrode layer and the second electrode layer of the LCD panel without going through the coupling unit, in addition to and together with the coupled first and second driving signals, wherein the third driving signal and the first driving signal effect 3D image display;
    receiving from at least one of the first electrode layer and the second electrode layer a feedback signal and separating from the feedback signal a capacitance change signal indicating a capacitance change corresponding to a touch on the LCD panel; and
    determining a touch position of the touch on the LCD panel based on the feedback signal.

10. The method according to claim 9, wherein:
the first driving signal and the second driving signal are different on at least one of frequency, bandwidth, and signal strength.

11. The method according to claim 9, wherein:
the first driving signal has a first frequency in a range of approximately 10 to 1 KHz; and
the second driving signal has a second frequency greater than 1 KHz.

12. A display device, comprising:
a liquid crystal display (LCD) panel for displaying images;
an optical device, different from the LCD panel and stacking on top of the LCD panel, including a first electrode layer, a first alignment layer formed on the first electrode layer, a second electrode layer, a second alignment layer formed on the second electrode layer, a liquid crystal layer coupled between the first alignment layer and the second alignment layer on the first electrode layer and the second electrode layer, respectively, and a lens unit, wherein the lens unit includes a first lens array, a second lens array coupled with the first lens array, and a glass substrate coupled to the second lens array, and the first lens array is optically isotropic and the second lens array is optically anisotropic such that the coupled first lens array and second lens array change direction of light from the LCD panel in a first polarization direction and maintain direction of light from the LCD panel in a second polarization direction;
a first driving circuit configured to provide a first driving signal at a first frequency;
a second driving circuit configured to provide a second driving signal at a second frequency, different from the first frequency;
a coupling unit coupled to the first driving circuit and the second driving circuit to receive the first driving signal and the second driving signal at the same time and configured to couple the first driving signal and the second driving signal in a frequency domain and to provide the coupled signal of the first driving signal and second driving signal to both of the first electrode layer and the second electrode layer such that the first driving signal drives the optical device for processing lights from the LCD panel, and the second driving signal drives the optical device for being touch-sensitive; and
a signal separation unit, separate and different from the first driving circuit and the second driving circuit, coupled to at least one of the first electrode layer and the second electrode layer to receive a feedback signal and to separate from the feedback signal a capacitance change signal indicating a capacitance change corresponding to a touch on the optical device,
wherein the first driving circuit is further configured to separately provide a third driving signal to both of the first electrode layer and the second electrode layer of the LCD panel without going through the coupling unit, in addition to and together with the coupled first and second driving signals, wherein the third driving signal and the first driving signal effect 3D image display.

13. The display device according to claim 12, wherein:
the signal separation unit is further coupled to the second driving circuit to provide the capacitance change signal separated from the feedback signal to the second driving circuit for calculating a touch position of the touch on the optical device.

14. The display device according to claim 12, wherein:
the coupled first driving signal and second driving signal are provided to the first electrode layer and the second electrode layer to change polarization direction of lights from the LCD panel going through the lens unit of the optical device for 3D image display.

15. The display device according to claim 14, wherein:
the first frequency is in a range of approximately 10 to 1 KHz; and
the second frequency is greater than 1 KHz.

16. The display device according to claim 14, wherein:
the first frequency is approximately 120 Hz; and
the second frequency is approximately 240 Hz.

17. The display device according to claim 12, wherein:
the first electrode layer and the second electrode layer are configured to form a self-capacitance structure when the second driving signal is provided to the first electrode layer and the second electrode layer.

18. The display device according to claim 12, wherein:
the first electrode layer and the second electrode layer are configured to form a mutual-capacitance structure when the second driving signal is provided to the first electrode layer and the second electrode layer.

19. The display device according to claim 2, wherein:
the coupling unit is coupled to the first driving circuit and the second driving circuit on two inputs, and provides the coupled signal of the first driving signal and second driving signal to both of the first electrode layer and the second electrode layer from an output; and
the signal separation unit is coupled to at least one of the first electrode layer and the second electrode layer on an input and is further coupled to the second driving circuit on an output.

20. The display device according to claim 9, wherein:
the feedback signal is processed by a signal separation unit, and a capacitance change signal is separated from the feedback signal for determining the touch position of the touch on the LCD panel.

\* \* \* \* \*